United States Patent [19]

Chabbal

[11] Patent Number: 4,694,316
[45] Date of Patent: Sep. 15, 1987

[54] MULTILINEAR CHARGE TRANSFER ARRAY AND ANALYSIS PROCESS

[75] Inventor: Jean J. Chabbal, St. Egreve, France

[73] Assignee: Thomson-CSF, Paris

[21] Appl. No.: 731,554

[22] Filed: May 7, 1985

[30] Foreign Application Priority Data

May 18, 1984 [FR] France ................. 84 07761

[51] Int. Cl.[4] .......... H01L 29/78; H01L 27/14; H01L 31/00
[52] U.S. Cl. .................. 357/24; 357/30
[58] Field of Search .................. 357/24, 30

[56] References Cited

U.S. PATENT DOCUMENTS

| | | | |
|---|---|---|---|
| 3,866,067 | 2/1975 | Amelio | 357/24 LR |
| 4,131,950 | 12/1978 | van Santen | 357/24 LR |
| 4,280,141 | 7/1981 | McCann et al. | 357/24 M |
| 4,290,693 | 9/1981 | Stein | 357/24 LR |
| 4,336,557 | 6/1982 | Koch | 357/24 LR |
| 4,375,652 | 3/1983 | White | 357/24 LR |
| 4,410,811 | 10/1983 | Koch | 357/24 LR |
| 4,513,313 | 4/1985 | Kinoshita et al. | 357/24 LR |
| 4,580,155 | 4/1986 | Tsoi et al. | 357/24 LR |

OTHER PUBLICATIONS

Patents Abstracts of Japan, vol. 6, No. 25 (E-94) (903), Feb. 13, 1982; JP-A-56 146 377 (Fujitsu K.K.) (13.11.1981).

Patents Abstracts of Japan, vol. 5, No. 181 (E-83) (853), Nov. 20, 1981; JP-A 56 109 076 (Fujitsu K.K.) (29.08.1981).

Primary Examiner—Gene M. Munson
Attorney, Agent, or Firm—Roland Plottel

[57] ABSTRACT

The present invention relates to a multilinear charge transfer array having N rows of P detectors, each row successively receiving the radiation to be detected, an interface connecting the detectors to a group of charge transfer shift registers constituted by a first register with parallel inputs and series outputs having $N \times P$ stages separated into groups of N stages, in which each stage is connected to a detector of the same position of different rows, said register effecting the time delay and summation of the information and by a second register with parallel inputs and series outputs with $N \times P$ stages, communicating with the first register every N stages, the second register transferring the summated charges to a reading stage giving at the output solely a signal corresponding to the sum of the information collected on the detectors occupying the same position on the various rows.

24 Claims, 11 Drawing Figures

MULTILINEAR CHARGE TRANSFER ARRAY AND ANALYSIS PROCESS

BACKGROUND OF THE INVENTION

1. Field of the invention

The present invention relates to a novel multilinear charge transfer array structure, as well as to its analysis process.

2. Description of the prior art

Multilinear arrays generally comprise N rows of P photosensitive detectors, such as photodiodes, each row successively receiving the radiation to be detected, and a device making it possible to summate in synchronism with the movement, the informations collected on the detectors on the same row, said device being known as time delay integration or TDI.

FIG. 1 diagrammatically shows the first detectors $D_1, D_2, \ldots D_N$ of each row, as well as a device performing the TDI function for these N detectors. An arrow running from left to right also indicates the movement direction of the array in front of the object or body 1 emitting the radiation to be detected. For the in phase summation of the collected information, it is necessary to supply thereto time delays of times value $T, 2T, \ldots NT$, in which T is the passage time of the object or body emitting the radiation, in front of each detector. T is also the integration time of each detector. FIG. 1 diagrammatically shows that a time delay T is supplied to the information from detector $D_1$ before being supplied to a summator, a time delay 2T is supplied to the information from detector $D_2$ and so on.

In the case of multilinear arrays of this type, the integration time is multiplied by N. However, the reading noise is summated in a quadratic manner, so that there is a gain on the signal to noise ratio equal to $\sqrt{N}$. Thus, this type of photosensitive array is of particular interest for capturing X-ray pictures, because it makes it possible to reduce the X-ray dose used for the same exposure time.

In addition, this type of photosensitive array is also used in the analysis of documents by contact in order to improve the resolution in the paper movement or advance direction.

SUMMARY OF THE INVENTION

The object of the present invention is to supply a novel multilinear charge transfer array structure operating according to the TDI principle.

The present invention therefore specifically relates to a multilinear charge transfer array having N rows of P photosensitive detectors, each row successively receiving the radiation to be detected, charge transfer shift registers ensuring the in phase summation of the information detected on the detectors occupying the same position on the various rows, and an interface between the detectors and the registers, wherein the charge transfer shift registers are constituted by a first register with parallel inputs and series outputs having N×P stages separated into groups of N stages, in which each stage is connected via the interface to a detector of the same position on the various rows, said register effecting the time delay and summation of the information, as well as a second parallel register, having at least P stages and communicating with the first register at the Nth stage, the second register transferring the summated charges to a reading stage giving at the output solely the signal corresponding to the sum of the information collected on the detector, occupying the same position on the various rows.

The aforementioned multilinear array has a much simpler and more compact structure than the prior art multilinear arrays having the same number of rows. However, for technical reasons, this structure is limited to multilinear arrays having a small number of rows, such as the arrays used for digitized mamography. Thus, the length of the N stages in the shift register is preferably equal to the side of a photodetector. However, with existing technology, the length of one stage is at least 20 microns.

The present invention also relates to a process for the analysis of the multilinear array. The process comprises at the end of each integration time feeding the change integrated by the detectors occupying the same position on the various rows, into the corresponding stages of the first charge transfer shift register, where they are added to the already present charges, transferring the charges contained in the Nth stages of the first register to the corresponding stages of the second shift register and then, in the first register, transferring the charges from one stage to the next stage, during part of the following integration time, transferring the charges of the second register to the reading stage which reads the P useful signals.

BRIEF DESCRIPTION OF THE DRAWINGS

The invention is described in greater detail hereinafter relative to non-limitative embodiments and the attached drawings, wherein show.

In the various drawings, the same references designate the same elements, but for reasons of clarity the dimensions and proportions of the various elements have not been respected.

DESCRIPTION OF THE PREFERRED EMBODIMENTS

FIGS. 2 to 6 relate to a first embodiment of a multilinear array according to the invention.

Figure 1:
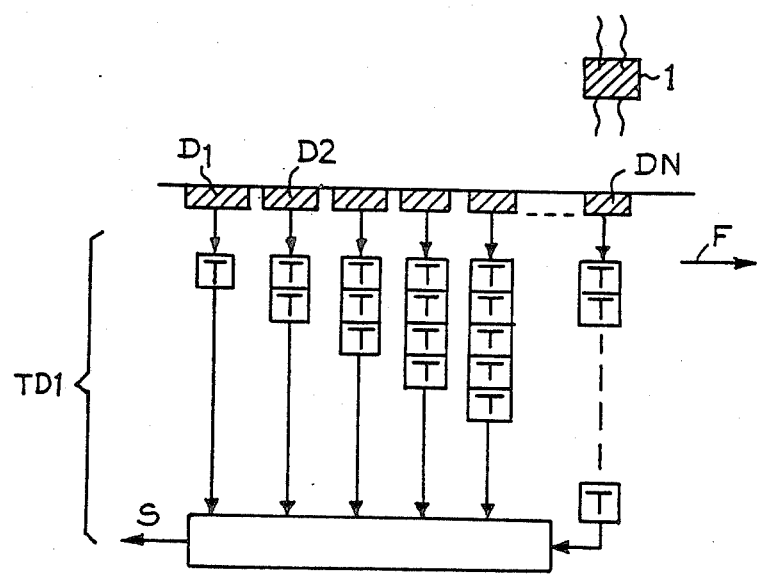
FIG. 1, already described, a diagram showing the connections between a TDI and the detectors $D_1$ to $D_N$, and explaining the operation of a TDI.
Figure 2:
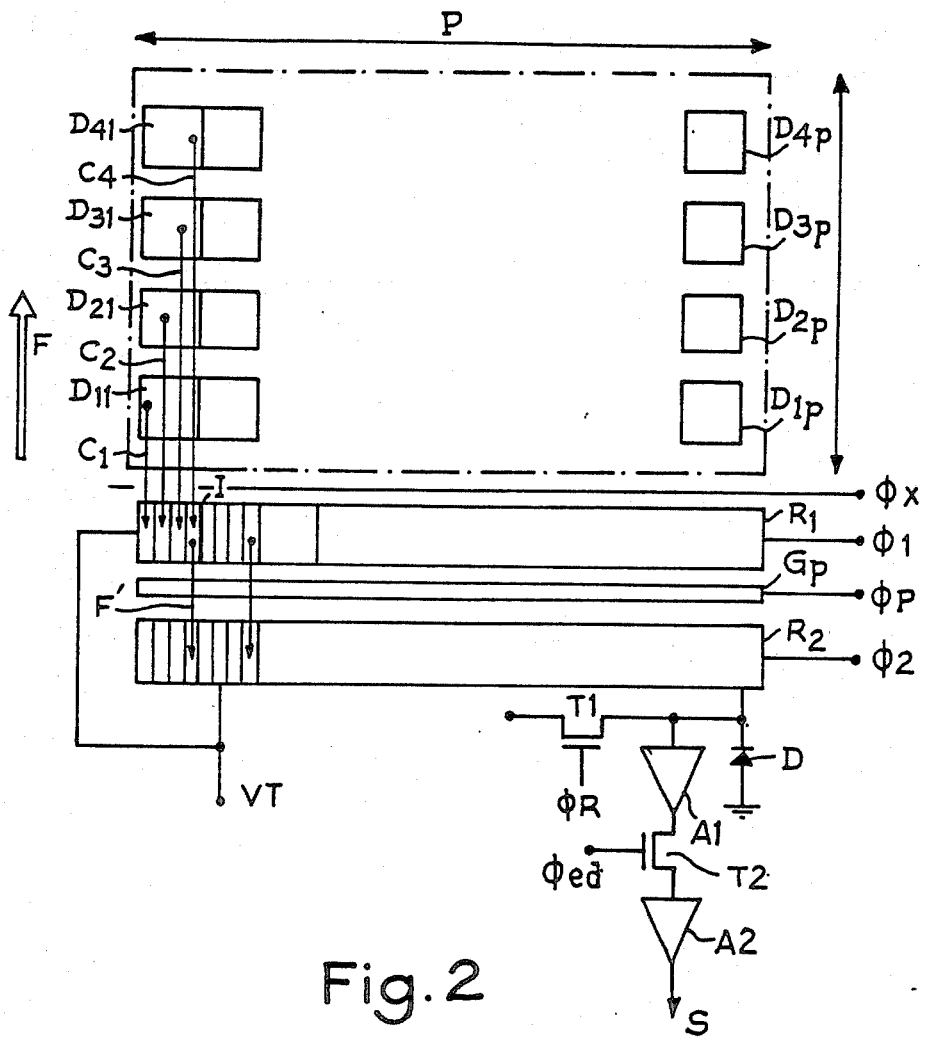
FIG. 2: a diagram of a first embodiment of a multilinear charge transfer arrangement according to the invention.

As shwon in FIG. 2, a multilinear array of this embodiment is mainly constituted by a photosensitive zone having N rows of P detectors $D_{11}$, $D_{21}$, $D_{31}$, $D_{41}$ ... $D_{1P}$, $D_{4p}$, and a part realizing the TDI function. This assembly is preferably realized on the same semiconductor substrate which can e.g. be a type p silicon substrate. However, it is obvious to the worker in the art that other substrates can be used.

In the represented embodiment, the number of rows N is four. The photosensitive detectors $D_{11}$ to $D_{4p}$ are e.g. constituted by photodiodes. As is more clearly shown in FIGS. 2 and 4, the TDI part is mainly constituted by two charge transfer shift registers $R_1$ and $R_2$ of the CCD type arranged in parallel juxtaposed manner. The first shift register $R_1$ is a register with parallel inputs and series outputs having $N \times P$ stages subdivided into P groups of N stages by insulation barriers I. The second shift register $R_2$ is a register with parallel inputs and series output connected at the Nth stages to the first register $R_1$ by means of a passage gate $G_p$ raised to a periodic potential $\phi_p$. This connection between register $R_1$ and register $R_2$ is symbolized by arrow F' in FIG. 2. The other stages of the shift registers $R_1$ and $R_2$ are separated from one another by an insulation barrier I.

In a more specific manner, each column of four photosensitive detectors $D_{11}$, $D_{21}$, $D_{31}$, $D_{41}$ is connected to a group of four stages $e_1$, $e_2$, $e_3$, $e_4$ of the charge transfer shift register $R_1$ via a connection $C_1$, $C_2$, $C_3$, $C_4$ and an interface which, in the represented embodiment, comprises a passage gate $G_X$ connected to a potential $\phi_X$ and by a diode $D'_1$, $D'_2$, $D'_3$, $D'_4$.

In the represented embodiment, registers $R_1$ and $R_2$ are constituted by single phase charge transfer shift registers which makes it possible to obviate a control phase, as will be explained in greater detail hereinafter. However, it is obvious to the expert that it is possible to use two-phase charge transfer shift registers or with a random number of control phases.

Figure 4:
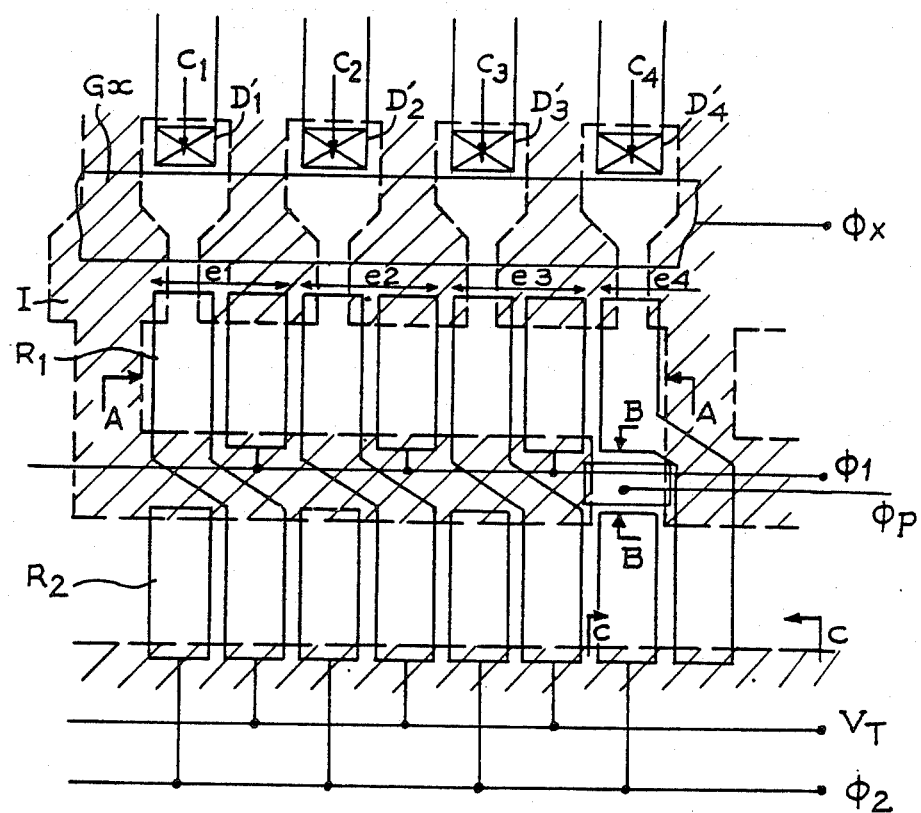
FIG. 4: a larger scale view of the part realizing the TDI and reading function in the array of FIG. 2.

As is more particularly shown in FIGS. 4 and 6(a), each stage of the charge transfer shift registers $R_1$ and $R_2$ comprises a pair of electrodes connected to a continuous control phase $V_T$, common to the two registers and by a pair of electrodes connected to an alternating control phase $\phi_1$ for register $R_1$ and $\phi_2$ for register $R_2$. As the continuous control phase $V_T$ is common to the two registers $R_1$ and $R_2$, register $R_2$ also has $N \times P$ stages. However, it is obvious to the worker in the art that in the case where $R_2$ is controlled independently of the $R_1$, register $R_2$ must have at least P stages communicating with the Nth stages of register $R_1$. In each pair, one of the electrodes is a storage electrode and the other is a transfer electrode.

Furthermore, in order to obtain a good transfer between registers $R_1$ and $R_2$, during the passage of charges from register $R_1$ to register $R_2$ under the control of the phase $\phi_p$ applied to gate $G_p$, the pairs of electrodes connected to the common phase $V_T$ are displaced by a half-stage.

Figure 6:
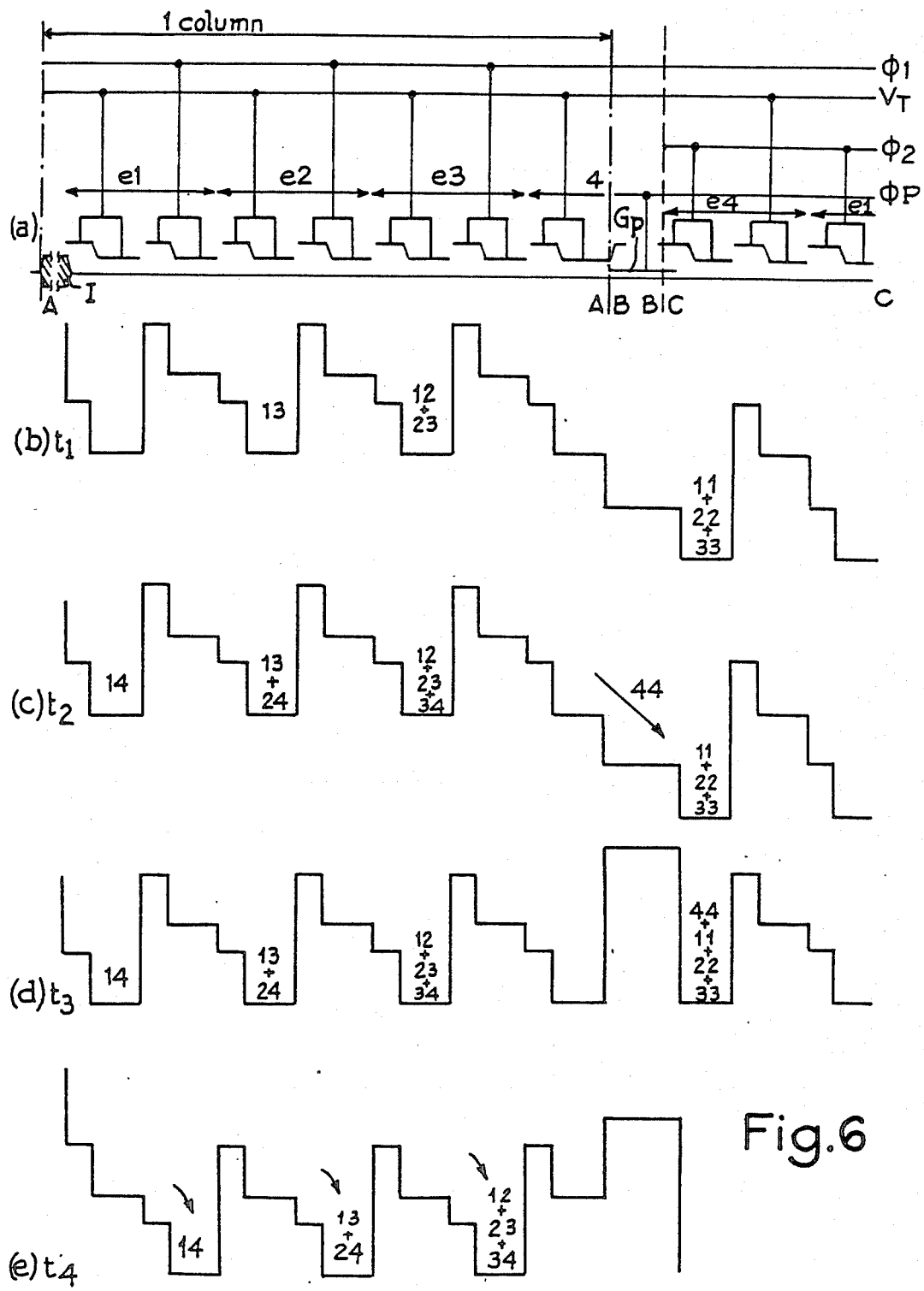
FIGS. 6(a) to 6(e): respectively a sectional view of the registers along A—A, B—B, and C—C in FIG. 3, and potential well representation explaining the operation of the TDI part.

The assymetry in the surface potentials necessary for making the transfer unilateral is e.g. realized by an extra oxide thickness as shown in FIG. 6, or by an implantation of impurities of the same type as the substrate.

Moreover, the series output of register $R_2$ is connected to a reading stage which, in per se known manner, has a reading diode D connected to a resetting MOS transistor $T_1$ whose gate is connected to potential $\phi_R$ and whose drain is at a d.c. voltage $V_R$. Diode D is also connected to an amplifier $A_1$, which is in turn connected to the second amplifier $A_2$ via a MOS transistor $T_2$, whose gate is connected to an a.c. voltage $\phi$ech. MOS transistor $T_2$ performs a sampling and blocking function, so that at the output of amplifier $A_2$ there is a signal every P signals at the output of register $R_2$, said signal being maintained during the output of the N following stages.

Figure 5:
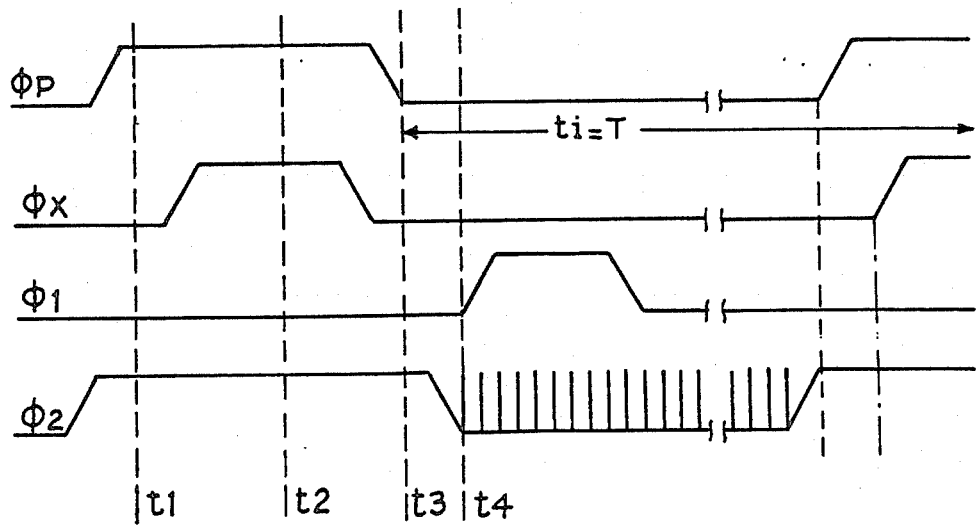
FIG. 5: a diagram of the different control phases as a function of time used with the multilinear arrays of FIG. 2.

The operation of the aforementioned multilinear array will now be described with more particular reference to FIGS. 3, 5 and 6.

To facilitate the understanding of FIG. 6(a), the different sections A—A, B—B, C—C of FIG. 4 are shown in the same plane.

Figure 3:
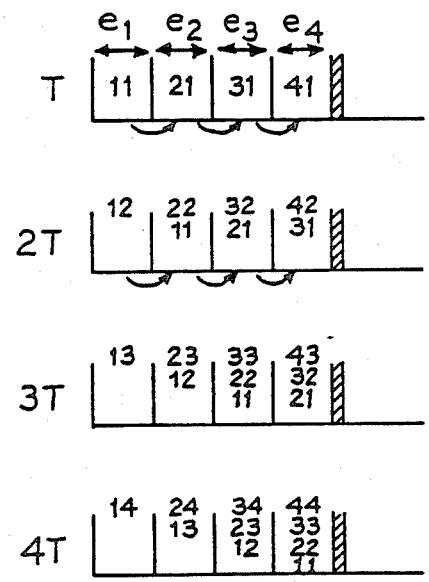
FIG. 3: a diagram explaining the realization of the time delay and summation function in the first register.

FIG. 3 symbolizes the realization of the time delay and summation function in register $R_1$ at a column of detectors in order to obtain the useful signal. Following an integration time T, in stages $e_1$, $e_2$, $e_3$, $e_4$ of register $R_1$, there are charges 11, 21, 31, 41 corresponding to the charges respectively integrated by the photodiodes of the first row, the second row, the third row and the fourth row. At the end of time T, there is a charge transfer, namely charges 41 having been read in the manner explained hereinafter, charge 31 passes into stage $e_4$, charge 21 into stage $e_3$, and charge 11 into stage $e_2$. Said transfer is symbolized by arrows. At the end of time 2T, there is again an integration in stages $e_1$, $e_2$, $e_3$, $e_4$ of charges 12, 22, 32, 42, corresponding to the charges read by the photodiodes of the different rows during a new integration time T. This is followed by the transfer of the charges of one stage, as symbolized by the arrows and the same operation is recommenced for times 3T and 4T. Thus, at the end of time 4T, there is a charge 14 in stage $e_1$, a charge 24 plus 13 in stage $e_2$, a charge 34+23+12 in stage $e_3$ and a charge 44+33+22+11 in stage $e_4$, which corresponds to the useful signal which it is wished to read, namely the sum of the signals successively read by the photodiodes of the same position on the different rows at the end of the scanning of the four rows.

An explanation will now be given with particular reference to FIGS. 5 to 6 of the different operations performed during an integration time T. As a function of time, FIG. 5 shows the different periodic potentials $\phi_p$, $\phi_X$, $\phi_1$ and $\phi_2$ respectively applied to the gates $G_p$, $G_X$, register $R_1$ and register $R_2$.

FIGS. 6(b) to 6(e) show the shape of the potential wells beneath the stages of $R_1$, gate $G_p$ and the stages of $R_2$ at the different times $t_1$, $t_2$, $t_3$, $t_4$ of the integration time T.

At time $t_1$, potentials $\phi_p$ and $\phi_2$ are at high level, whilst potentials $\phi_X$ and $\phi_1$ are at low level. Therefore the charges stored in stage $e_4$ of register $R_1$ during the preceding integration time are transferred into stage $e_4$ of register $R_2$, as shown in FIG. 6(b).

At time $t_2$, $\phi_p$ and $\phi_2$ remain at high level, potential $\phi_X$ is raised to a high level and then the charge integrated during the integration time T beneath the photodiodes of the different rows are transferred to the different stages $e_1$, $e_2$, $e_3$, $e_4$ of register $R_1$.

As shown in FIGS. 6(c), the charges so transfered are added to the charges already present in the different stages $e_1$, $e_2$, $e_3$, whilst at stage $e_4$ charge 44 is directly transferred beneath stage $e_4$ of register $R_2$.

Thus, by appropriately controlling the phase $\phi_p$, it is possible to directly transfer the charge from a photodiode $D_{4p}$ below stage $e_4$ of register $R_2$ so that it is possible to have a less high capacity at the stages of register $R_1$, because these stage realize a mazimum the sum of threee integrations, namely $11+22+33$.

At time $t_3$, $\phi_p$ is brought to low level, which insulates register $R_2$ from register $R_1$, as shown in FIG. 6(d).

At time $t_4$, $\phi_1$ is raised to a high level, $\phi_2$ is brought to low level, whilst $\phi_X$ and $\phi_p$ both remain at low level.

Thus, the charges of stages $e_1$, $e_2$, $e_3$ being beneath the pair of electrodes controlled by the continuous phase $V_T$ are transferred beneath the pair of electrodes controlled by the phase $\phi_1$, as shown in FIG. 6. In the same way, in register $R_2$ the charges are transferred to the output. This transfer is symbolized by the vertical lines in FIG. 5 and takes place during most of the following integration times.

Figure 7:
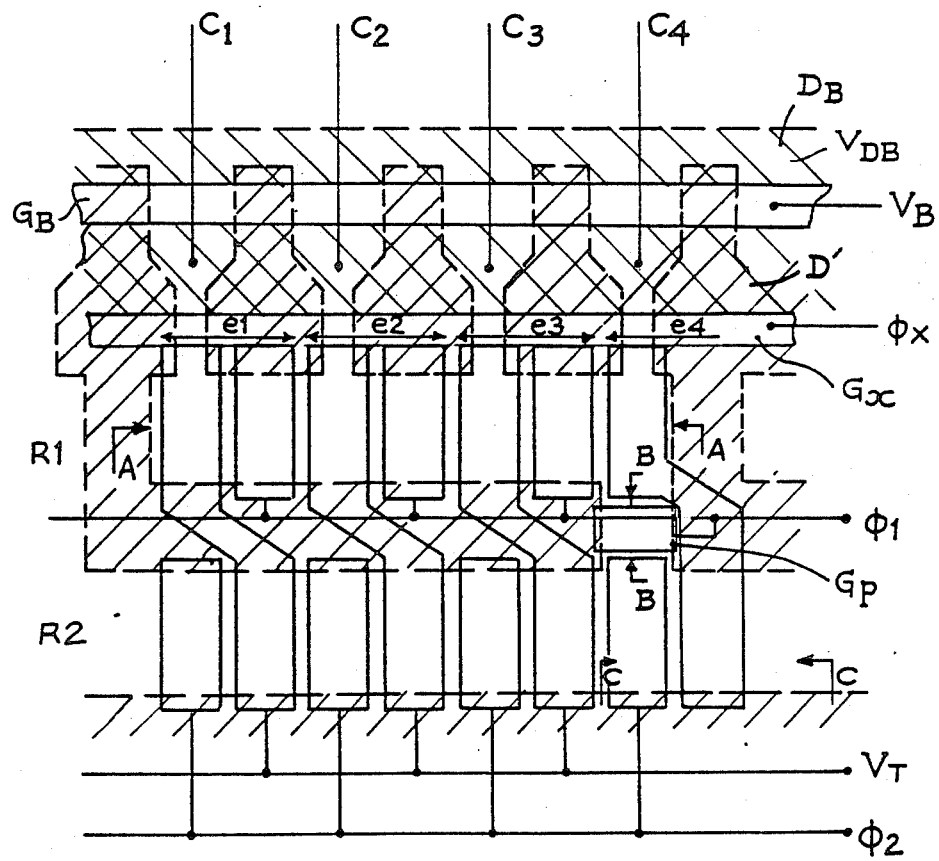
FIG. 7: a view identical to that of FIG. 3 of another embodiment of the TDI part.
Figure 8:
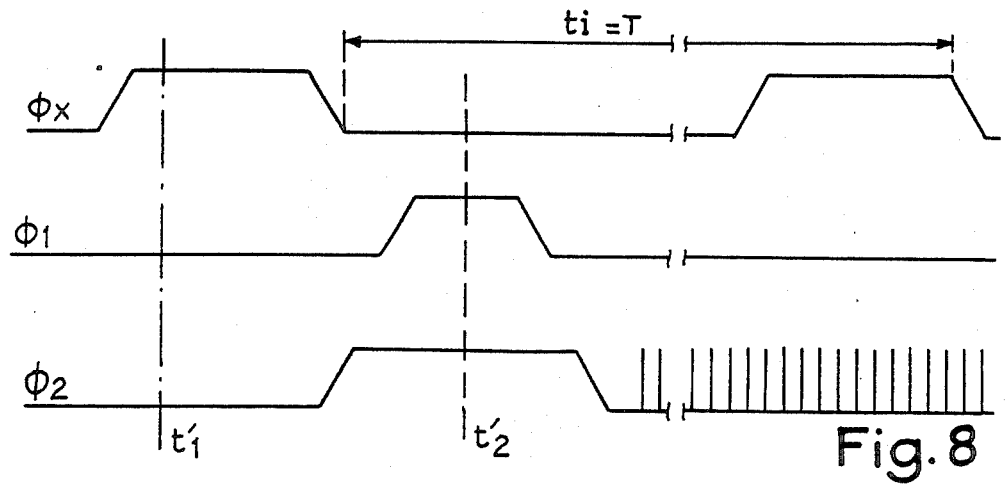
FIG. 8: a diagram of the different control phases as a function of time.
Figure 9:
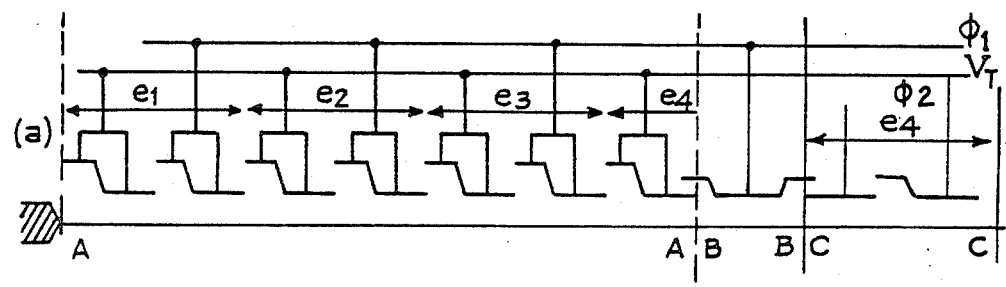
FIG. 9(a) to 9(c): respectively a sectional view of the registers along A—A, B—B, and C—C of FIG. 7 and potential well representations explaining the operation of the TDI part.
Figure 9:
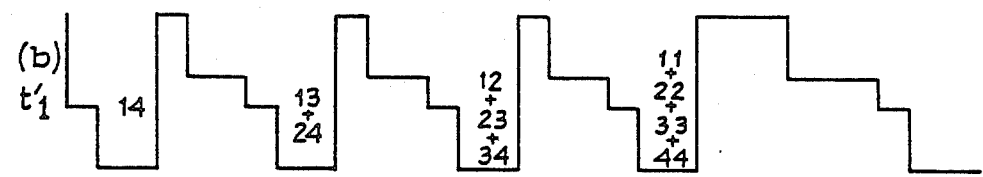
Figure 9:
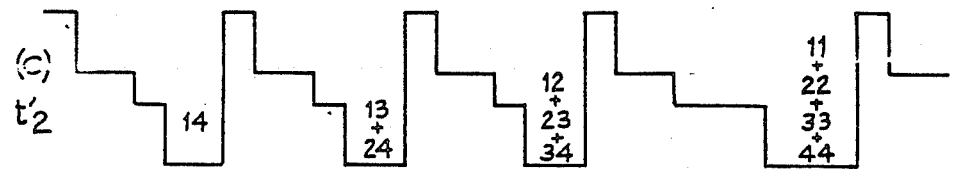

With reference to FIGS. 7 to 9, a description will now be given of another embodiment of the multilinear array according to the invention. In this embodiment, the photosensitive zone of the multilinear array is identical to the photosensitive zone of the embodiment of FIGS. 2 to 6. In the same way, the CCD charge transfer shift registers $R_1$ and $R_2$ are identical in both embodiments. The differences between the two embodiments are based on the fact that the passage gate $G_P$ between registers $R_1$ and $R_2$ is controlled by the control potential $\phi_1$, which controls the transfer of charges into register $R_1$. Moreover, the interface between the photodiodes of the photosensitive zone and the inputs of the stages of shift register $R_1$ is realized by a charge injection device or CID associated with anti-blooming device. The CID is of particular interest in the case where the capacity of the photodetectors and their connections is high. As shown in FIG. 7, the CID is constituted by a diode D' and by a passage gate $G_X$ connected to a potential $\phi_X$, which controls the passage of the charges from diode D' to the input of a corresponding stage $e_1$, $e_2$, $e_3$, $e_4$ of shift register $R_1$. Thus, the charge injection device is constituted by a MOS transistor, whose drain is realized by diode D', the gate by $G_X$ and the source induced by the input stage of register $R_1$.

Moreover, in the embodiment of FIG. 7, the multilinear array comprises, on the side of diode D' opposite to register $R_1$, a gate $G_B$ raised to a fixed voltage $V_B$ and a diode $D_B$ raised to a polarizing potential $V_{DB}$ forming an anti-blooming device.

Thus, when the transferred signal charge is too high compared with the capacity of each stage of register $R_1$, the excess charges are discharged over the potential barrier formed beneath gate $G_B$.

A description will now be given, with more particular reference to FIGS. 8 and 9, of the operation of this embodiment of the multilinear array according to the invention, in which the passage gate $G_p$ between the Nth stages of registers $R_1$ and $R_2$ is controlled by the control phase $\phi_1$ of register $R_1$.

FIG. 8 shows the diagram as a function of time of the potential $\phi_1$ and $\phi_2$ during an integration period T. At time $t'_1$, phases $\phi_1$ and $\phi_2$ are at low level, whilst phase $\phi_X$ is at high level. There is then a transfer of the charges integrated beneath diodes $D_{11}$ to $D_{4p}$ into stages $e_1$ to $e_4$ of register $R_1$. The charges integrated during this integration period are added to the charges already present in stages $e_1$ to $e_4$ of register $R_1$.

As $\phi_1$ is at low level, the passage between register $R_1$ and register $R_2$ is blocked, as is shown in FIG. 6(b). Thus, stages $e_4$ of register $R_1$ have charges $11+22+33+44$ corresponding to the four integraton times necessary for the scanning by the complete array.

$\phi_X$ is then brought to low level, as shown in FIG. 8. A new integration of the charges in the photodiodes can recommence. At time $t'_2$ during the new integration of the charges, $\phi_1$ and $\phi_2$ are at high level. Therefore the charges stored beneath stage $e_4$ of register $R_1$ are transferred beneath stage $e_4$ of register $R_2$, whilst the charges beneath the electrodes controlled by $V_T$ of stages $e_1$, $e_2$, $e_3$, of register $R_1$ pass beneath the electrodes controlled by $\phi_1$ of the same stages, as shown in FIG. 2(c).

$\phi_1$ is then brought to low level, which blocks the passage between registers $R_1$ and $R_2$ and a periodic potential symbolized by the vertical bars of FIG. 8 is then applied to register $R_2$ to carry out the transfer of charges $11+22+33+44$ to the reading stage, where they are read in the same way as in the embodiment of FIGS. 2 to 6.

In this embodiment, only three control signals $\phi_X$ and $\phi_1$ and $\phi_2$ are necessary for controlling the transfer of charges from the photosensitive zone to the reading stage, by performing the TDI function. However, as the passage gate $G_p$ between register $R_1$ and register $R_2$ is controlled by the same phase $\phi_1$ as register $R_1$, it is no longer possible to directly transfer the charge integrated by photodiodes $D_{4p}$ to the stages $e_4$ of register $R_2$. Thus, the capacity of the stages of register $R_1$ must be greater than in the embodiment of FIGS. 2 to 6.

A description will now be given with reference to FIGS. 10 and 11 to two possible uses of the multilinear charge transfer array according to the invention.

Figure 10:
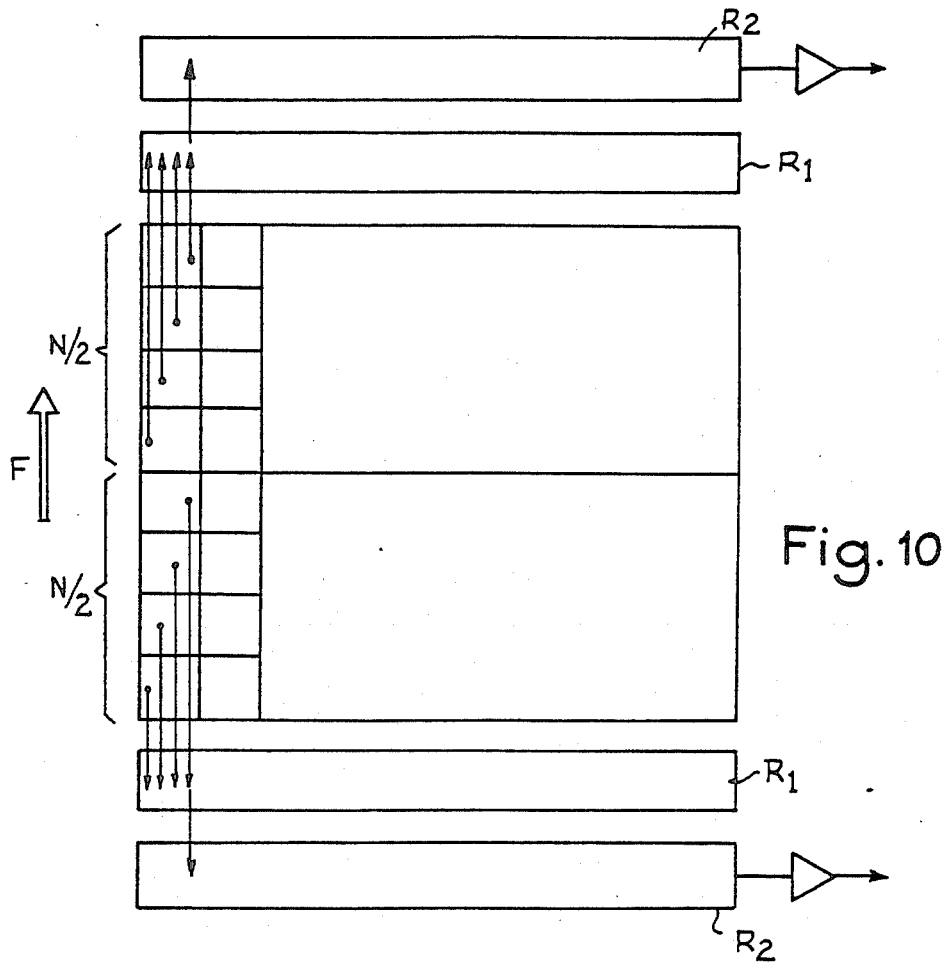
FIGS. 10 and 11: diagrammatic representations illustrating the possibilities of the use of a multilinear array according to the invention.

As shown in FIG. 10, in order to increase the number of rows of photodetectors of the multilinear array, it is possible to provide two TDI parts corresponding to the TDI parts of the present invention on either side of the photosensitive zone. Thus, in the embodiment of FIG. 10, the photosensitive zone is constituted by eight rows of P photodetectors, each group of four contiguous rows being connected to a TDI part. A multiplexer is provided at the output of the two TDI parts in order to obtain the useful signal.

Figure 11:
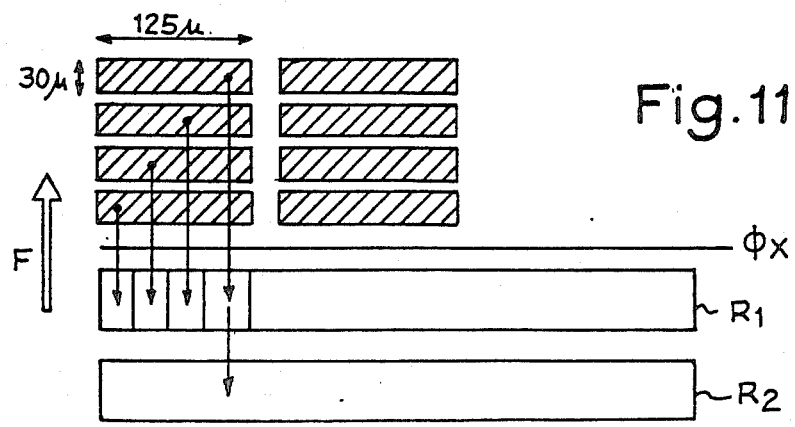

FIG. 11 shows the application of the multilinear array according to the present invention, to the analysis of documents by contact. In general, the photodiodes used in the arrays permitting the analysis by contact of an A4 page in a facsimile machine are square photodiodes of side length 125 microns, arranged in the form of a single row. In order to increase the resolution and as shown in FIG. 11, the photodiodes are subdivided so as to form four rows of photodiodes of sizes 125×30 microns and spaced by 125 microns.

A description of the structure of an elementary array has been given hereinbefore. In order to obtain very long multilinear arrays, several such elementary arrays are combined. Thus, in the analysis of documents by contact, the combination of devices such as shown in FIG. 11 consisting in each case of 288 photodiodes, makes it possible to obtain 1728 points on a length of 216 mm.

The embodiments described hereinbefore have been given in an illustrative manner and can be modified in various ways. Thus, the charge transfer shift registers $R_1$ and $R_2$ used in the embodiments shown are registers in which the charge transfer takes place on the surface. However, it is obvious to the worker in the art that these registers can be replaced by those in which the transfer takes place in the volume, which decreases the noise.

I claim:

1. An imaging system operable in a time delay integration mode comprising a multilinear array of photodetectors in N rows, each including a set of P photodetectors, means including a plurality of charge transfer shift register for in-phase summing of the N signals detected in the photodetector at the corresponding position in the row for each of the N rows, means for transferring the signals detected to the shift registers, the plurality of shift registers including a first shift register having P separate sections one for each of the P positions in each row, each section including N stages coupled together in shift register relationships, each stage being supplied by way of the transferring means by a separate photodetector the N stages of each section being supplied by the N photodetectors of corresponding position of the array, wherein each section effects the time-delay integration of the N signals for each of the P positions of the array, and a second charge shift register of P stages coupled together in shift register relationship having P parallel inputs, one for each stage and a serial output, each separate input being supplied by a respective one of the Nth stages of the respective ones of the P sections of the first register, whereby at the serial output there results an output signal corresponding to the sum of signals collected on the photodetectors occupying the same position in the N rows.

2. An imaging system in accordance with claim 1 wherein the first and second shift registers are single phase shift registers controlled by a continuous control phase and an alternating control phase.

3. An imaging system according to claim 2, wherein the continuous control phase (VT) is the same for the two charge transfer registers.

4. An imaging system according to claim 3, wherein the second register has N×P inputs, only the Nth input being connected to the first register.

5. An imaging system according to claim 2, wherein the two charge transfer registers comprise pairs of electrodes connected respectively to the continuous control phase and the alternating control phase, the continuous control phase being connected to one electrode of the pair of the first register and to the other electrode of the pair of the second register.

6. An imaging system according to claim 1, wherein the communication between the two registers is realized, at the level of the Nth inputs of the first register, by a passage gate raised to a periodic potential.

7. An imaging system according to claim 6, wherein the periodic potential applied to the passage gate is the alternating control phase of the first shift register.

8. An imaging system according to claim 6, wherein the periodic potential applied to the passage gate permits the direct transfer of charges integrated in the photodiodes from the Nth row into the corresponding inputs of the second register.

9. An imaging system according to claim 1, wherein the interface between the detectors and the first shift register is constituted by a charge injection device of the information provided between each connection connected to a detector and an input of the first register, said device also ensuring the polarization of the detector.

10. An imaging system according to claim 9, wherein each charge injection device is constituted by a charge injection diode connected to one of the connections and an injection gate controlling the passage of the charges to one input of the first shift register.

11. An imaging system according to claim 9, wherein the injection device is combined with an anti-blooming device constituted by a diode separated from the injection diode by a gate raised to a fixed voltage.

12. An imaging system according to claim 1, in which N is even and the plurality of shift registers includes two groups of shift registers, one group on each of the respective two opposite modes of the array, the first shift register of each group comprising P sections each having N/2 stages, each stage being supplied by way of the transferring means to a separate photodetector of the array.

13. An imaging system according to claim 12, wherein the two charge transfer registers of one group are single phase registers controlled by a continuous control phase and an alternating control phase.

14. An imaging system according to claim 13, wherein the continuous control phase is the same for the two charge transfer registers of a group.

15. An imaging system according to claim 14, wherein the second register of a group has N×P inputs, only the Nth input being connected to the first register.

16. An imaging system according to claim 13, wherein the two charge transfer registers of a group comprise pairs of electrodes connected respectively to the continuous control phase and the alternating control phase, the continuous control phase being connected to one electrode of the pair of the first register and to the other electrode of the pair of the second register.

17. An imaging system according to claim 12, wherein communication between the two registers is realized, at the level of the Nth inputs of the first register, by a passage gate (Gp) raised to a periodic potential (0p,01).

18. An imaging system according to claim 17, wherein the periodic potential applied to the passage gate is the alternating control phase of the first shift register.

19. An imaging system according to claim 17, wherein the periodic potential applied to the passage gate permits the direct transfer of charges integrated in the photodiodes from the Nth row into the corresponding inputs of the second register.

20. An imaging system according to claim 12, wherein the interface between the detectors and the first shift register is constituted by a charge injection device of the information provided between each connection connected to a detector and an input of the first register, said device also ensuring the polarization of the detector.

21. An imaging system according to claim 20, wherein each charge injection device is constituted by a charge injection diode (D) connected to one of the connections (C1, C2, C3, C4) and an injection gate (GX) controlling the passage of the charges to one input of the first shift register.

22. An imaging system according to claim 20, wherein the injection device is combined with an anti-blooming device constituted by a diode separated from the inspection diode by a gate raised to a fixed voltage.

23. A process for the analysis of an imaging system operable in a time delay integration mode comprising in combination:

a multilinear charge transfer array constituted by N rows of P photosensitive detectors, each row successively receiving the radiation to be detected.

a group of charge transfer shift registers ensuring the in phase summation of the information detected on the detectors occupying the same position on the various rows, and an interface between the detectors and registers, the group of charge transfer shift registers being constituted by a first register (R1) with parallel inputs and series outputs having N×P inputs separated into groups of N in which each input is connected via the interface to a detector of the same position on the various rows, said register effecting the time delay and summation of the information, and by a second parallel register (R2), having at least P inputs and communicating with the first register at the Nth stage, the second register transferring the summated information to a reading stage giving at the output the signal corresponding to the sum of the information collected on the detectors occupying the same position on the various rows into the first charge transfer shift register, through the corresponding inputs where they are added to the already present charges, transferring the charges contained in the Nth inputs of the first register to the corresponding inputs of the second shift register and then, in the first register, transferring the charges from one input and, during part of the following integration time, transferring the charges from the second input to the reading stage which reads the P useful signals.

24. A process according to claim 23, wherein the charges integrated in the Nth row of photodetectors are directly transferred to the corresponding inputs of the second register.

* * * * *